US007275897B2

(12) United States Patent
Reguzzi

(10) Patent No.: US 7,275,897 B2
(45) Date of Patent: Oct. 2, 2007

(54) DRILLING MACHINE FOR PANELS

(76) Inventor: Luigi Reguzzi, Via S. Alessandro, 139/141, 22060 Mariano Comense (COMO) (IT)

( * ) Notice: Subject to any disclaimer, the term of this patent is extended or adjusted under 35 U.S.C. 154(b) by 0 days.

(21) Appl. No.: 09/977,884

(22) Filed: Oct. 15, 2001

(65) Prior Publication Data

US 2002/0127069 A1     Sep. 12, 2002

(30) Foreign Application Priority Data

Nov. 17, 2000   (IT)   ................... MI2000A2484

(51) Int. Cl.
   *B23B 47/18*   (2006.01)
(52) U.S. Cl. .................. 408/35; 198/469.1; 198/474.1; 408/234; 408/87; 414/749.6
(58) Field of Classification Search ................. 408/35, 408/42, 69–70, 91–92, 234, 87; 226/170–172; 198/469.1, 474.1; 414/431, 917, 749.6
   See application file for complete search history.

(56) References Cited

U.S. PATENT DOCUMENTS

| 2,593,324 | A | * | 4/1952 | Mann | .......................... | 198/851 |
|---|---|---|---|---|---|---|
| 3,230,797 | A | * | 1/1966 | Murschel | ...................... | 408/89 |
| 3,559,256 | A | * | 2/1971 | Lemelson | .................... | 29/33 P |
| 4,706,373 | A | * | 11/1987 | Andriussi | ....................... | 483/7 |
| 5,064,048 | A | * | 11/1991 | Becker | ...................... | 198/345.1 |
| 5,109,584 | A | * | 5/1992 | Irie et al. | ..................... | 29/33 P |
| 6,609,861 | B2 | * | 8/2003 | Reguzzi | ........................ | 408/35 |

FOREIGN PATENT DOCUMENTS

| DE | 1169110 | * | 4/1964 | ................... | 408/69 |
|---|---|---|---|---|---|
| DE | 3305631 A1 | * | 9/1983 | | |
| DE | 3405529 | * | 8/1985 | ................... | 408/91 |

* cited by examiner

*Primary Examiner*—Daniel W. Howell
(74) *Attorney, Agent, or Firm*—Hedman & Costigan PC; James V. Costigan

(57) ABSTRACT

A drilling machine for drilling variable-thickness on-edge supported wood, plastics material, aluminum panels, comprises a bottom intermittent conveyor for abutting against a bottom edge of a panel and horizontally conveying a panel to be processed to a tool bearing a rotary turret, top horizontal axis vertically movable abutment and guide rollers for abutting against the top edge of the panel and rear vertical axis rollers. for abutting against and guiding the rear surface of the panel.

8 Claims, 8 Drawing Sheets

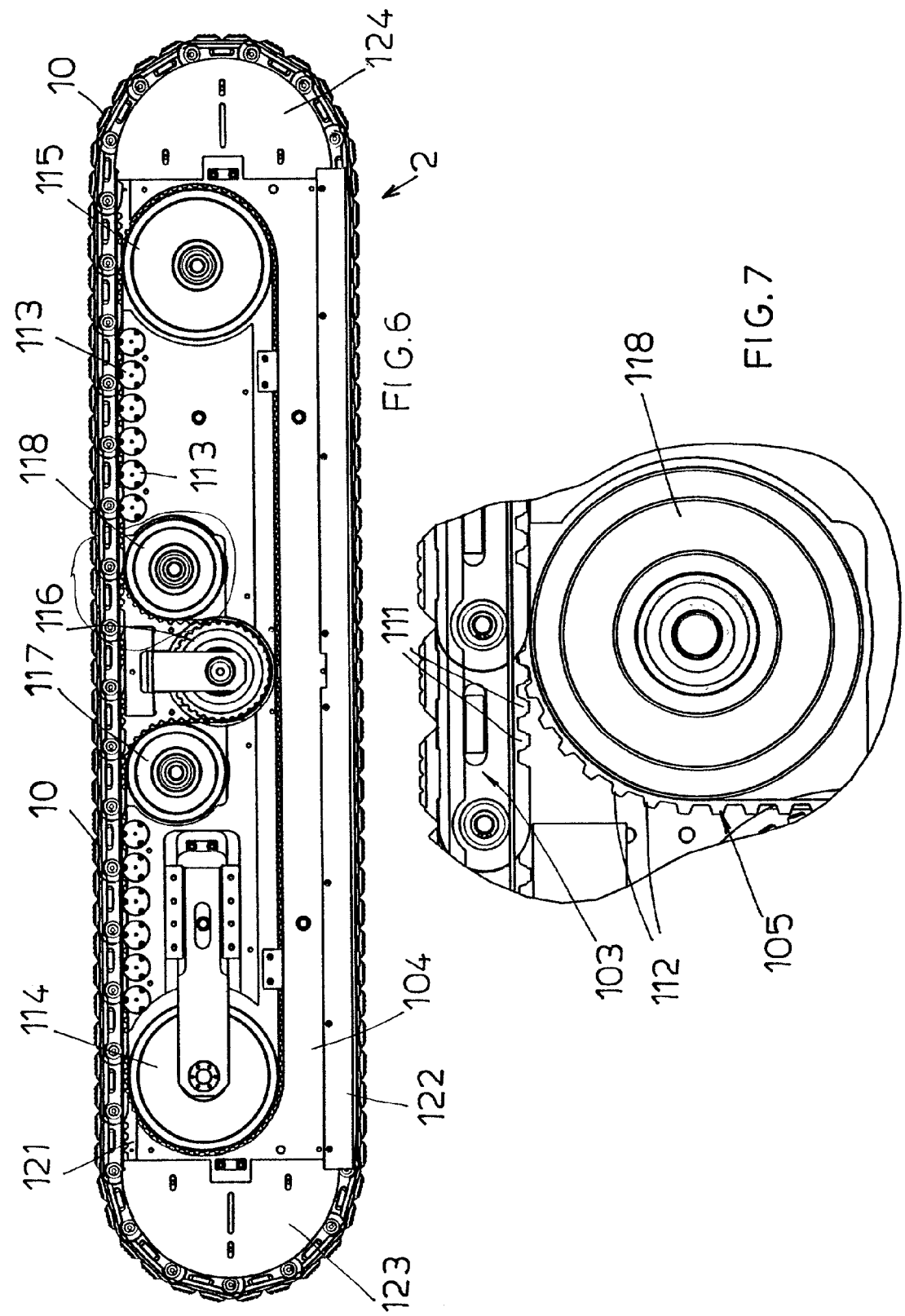

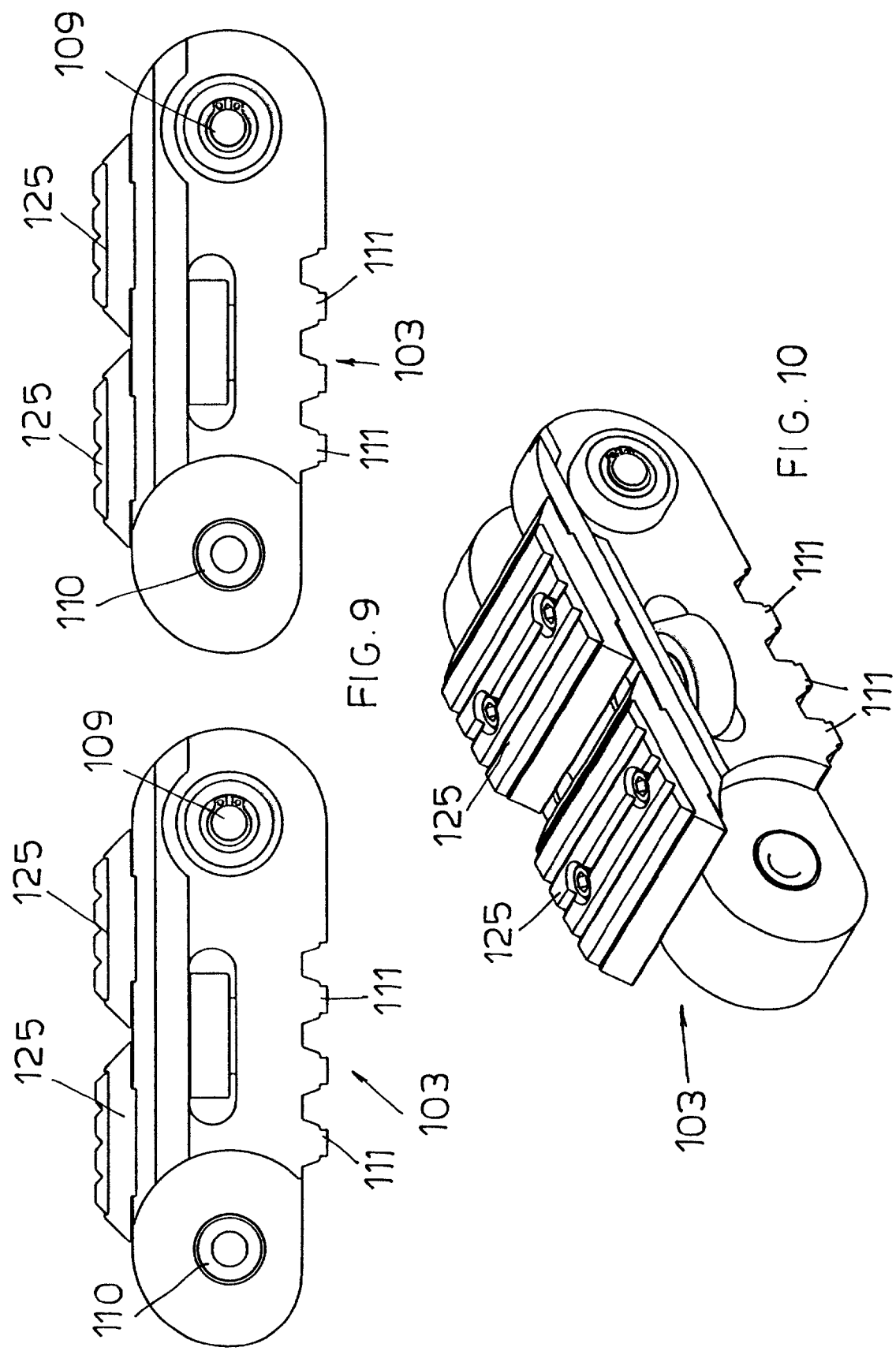

DRILLING MACHINE FOR PANELS

BACKGROUND OF THE INVENTION

The present invention relates to a drilling machine for panels made of wood, plastics materials, aluminum or the like.

The panel have a parallelepiped configuration and must be subjected to several drilling operations, to provide a plurality of spaced holes therethrough, to allow a panel to be coupled to other elements for forming a furniture piece, an equipped wall or other construction.

SUMMARY OF THE INVENTION

The aim of the present invention is to provide a drilling machine for drilling panels made of wood, plastics material, aluminum or the like, allowing the panel to be processed to be accurately and quickly located.

Within the scope of the above mentioned aim, a main object of the invention is to provide such a drilling machine for drilling panels of wood, plastics material, aluminum or the like, which can perform very accurate and quick processing operations.

Another object of the present invention is to provide such a panel drilling machine which is very reliable in operation.

According to one aspect of the present invention, the above mentioned aim and objects, as well as yet other objects, which will become more apparent hereinafter, are achieved by a drilling machine for drilling panels made of wood, plastics material, aluminum or the like, comprising conveyor means for conveying a panel to be processed along a horizontal axis x, by providing intermittent displacements, so as to arrange said panel at a tool bearing rotary turret, characterized in that said drilling machine further comprises: top horizontal guiding means vertically movable along an axis y; abutment means at said horizontal guiding means and designed for translating along an axis z to fit their position to a thickness of the panel being processed; holding means applied to vertical uprights and defining a fixed supporting wall for supporting said panel being processed; and bottom guiding means adapted to translate along said axis z, independently from said horizontal guiding means, and being adjustable depending on said thickness of said panel which thickness can change with respect to other regions of said panel.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example, in the accompanying drawings, where:

FIG. 6 is a view similar to the preceding view, but partially broken away, illustrating the conveyor means;

FIG. 7 is a partial view, on an enlarged scale, of the conveyor means;

FIG. 9 is a side elevation view illustrating two links of the conveyor belt; and FIG. 10 is a perspective top plan view of a link of the conveyor belt.

DESCRIPTION OF THE PREFERRED EMBODIMENTS

Figure 1:
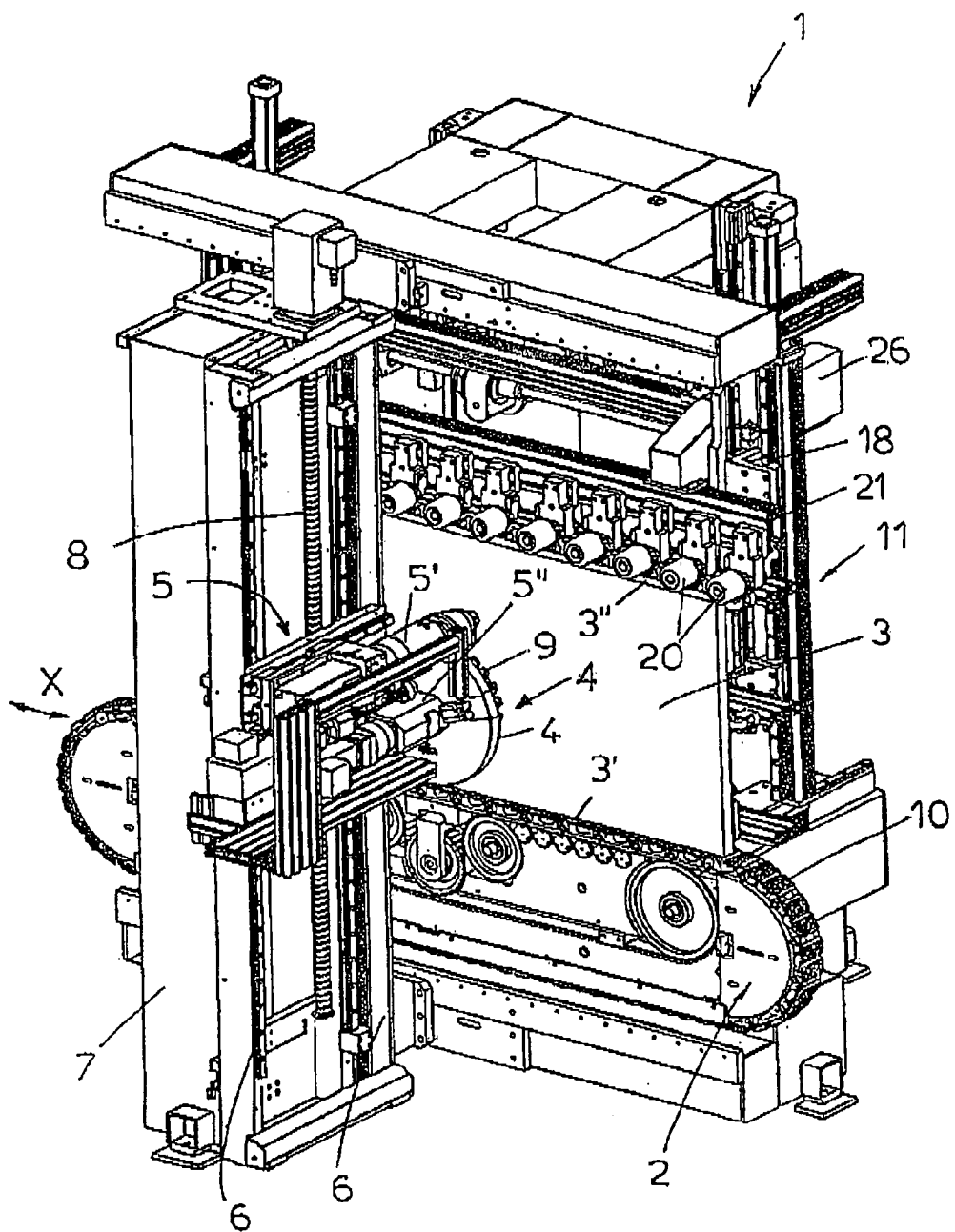
FIG. 1 is a perspective front view of the drilling machine according to the present invention.

With reference to the number references of the above mentioned figures, the drilling machine, for drilling panels in general, according to the present invention, and which has been generally indicated by the reference number 1, comprises conveyor means 2 designed for conveying a panel to be drilled 3 along a horizontal axis x, by intermittent or indexing displacements, so as to arrange said panel, in a very accurate and quick manner, at a tool bearing turret 4.

Said tool bearing turret 4, in particular, is mounted on a supporting element 5 which can be vertically driven along vertical guides 6, formed on an upright 7, the displacement of said supporting element 5 being controlled by a ball recirculating screw system 8, driving the turret 4 vertically.

Said turret 4 comprises a rotary turret head or drum 4' which can be rotatively driven through a 360° revolution angle and thereon are arranged small heads 9, coupled to the turret head 4' through bail recirculating shoes (not specifically shown), each head 4' including either an individual or a multiple spindle For supporting processing the panel 3 as desired.

The full rotation (i.e. a revolution through said 360° revolution angle) of turret head 4' can be carried out in a very quick manner in fact, each full revolution requires 1 second and 4/10. This quick rotary movement is driven by a brushless motor 5' and an epicycloidal reducer 5" unit or assembly.

As shown, the panel is held in a vertical position by abutting the bottom edge 3' of said panel 3 on convey or means 2, comprising an accurately fed conveyor track belt 10, and by abutting the top edge 3" of said panel 3 against rotary roller means 11 comprising a plurality of substantially adjoining horizontal axis rotary rollers 20, which can be vertically driven along the axis y by a brushless motor 14 rack assembly.

Figure 2:
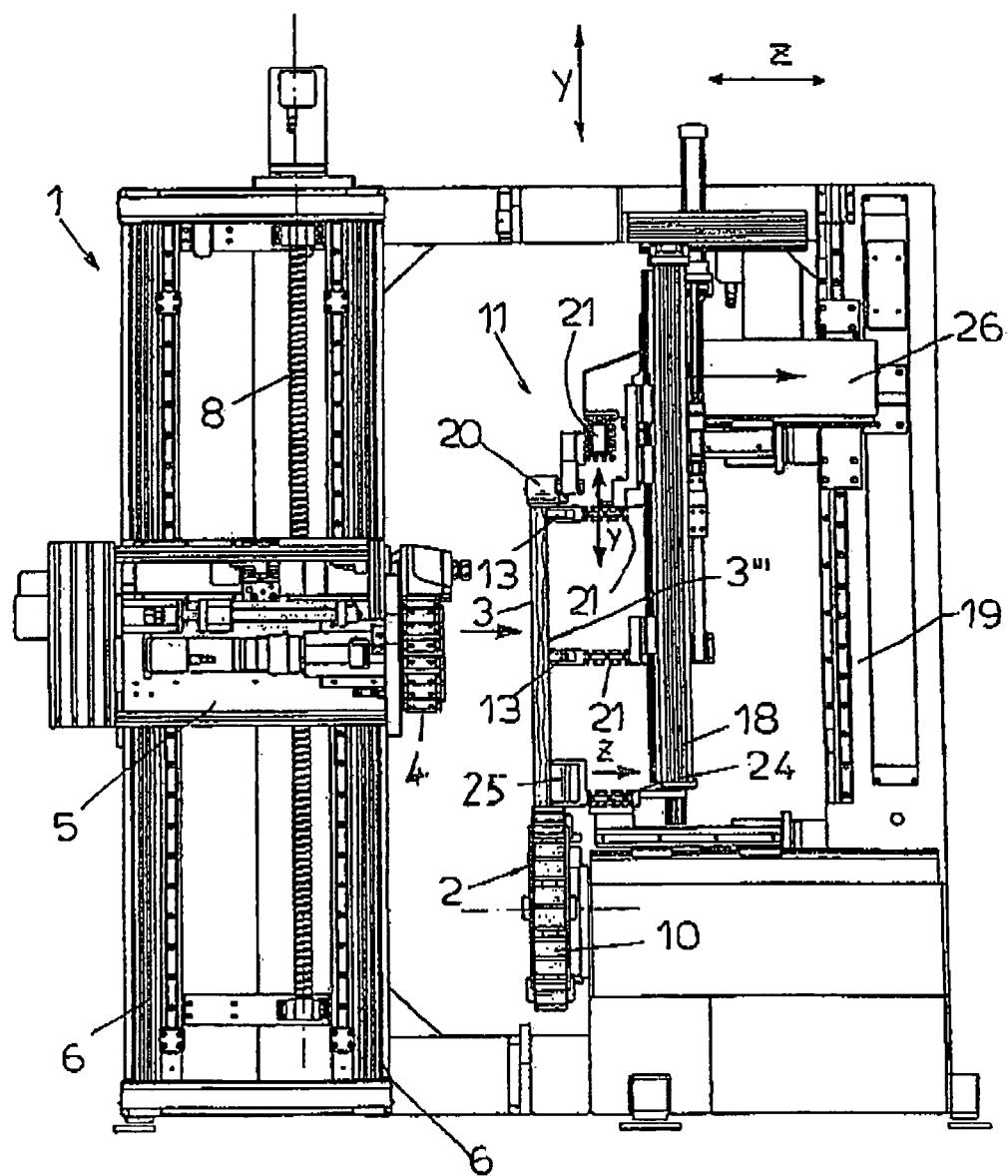
FIG. 2 is a side elevation view of the drilling machine according to the invention.
Figure 3:
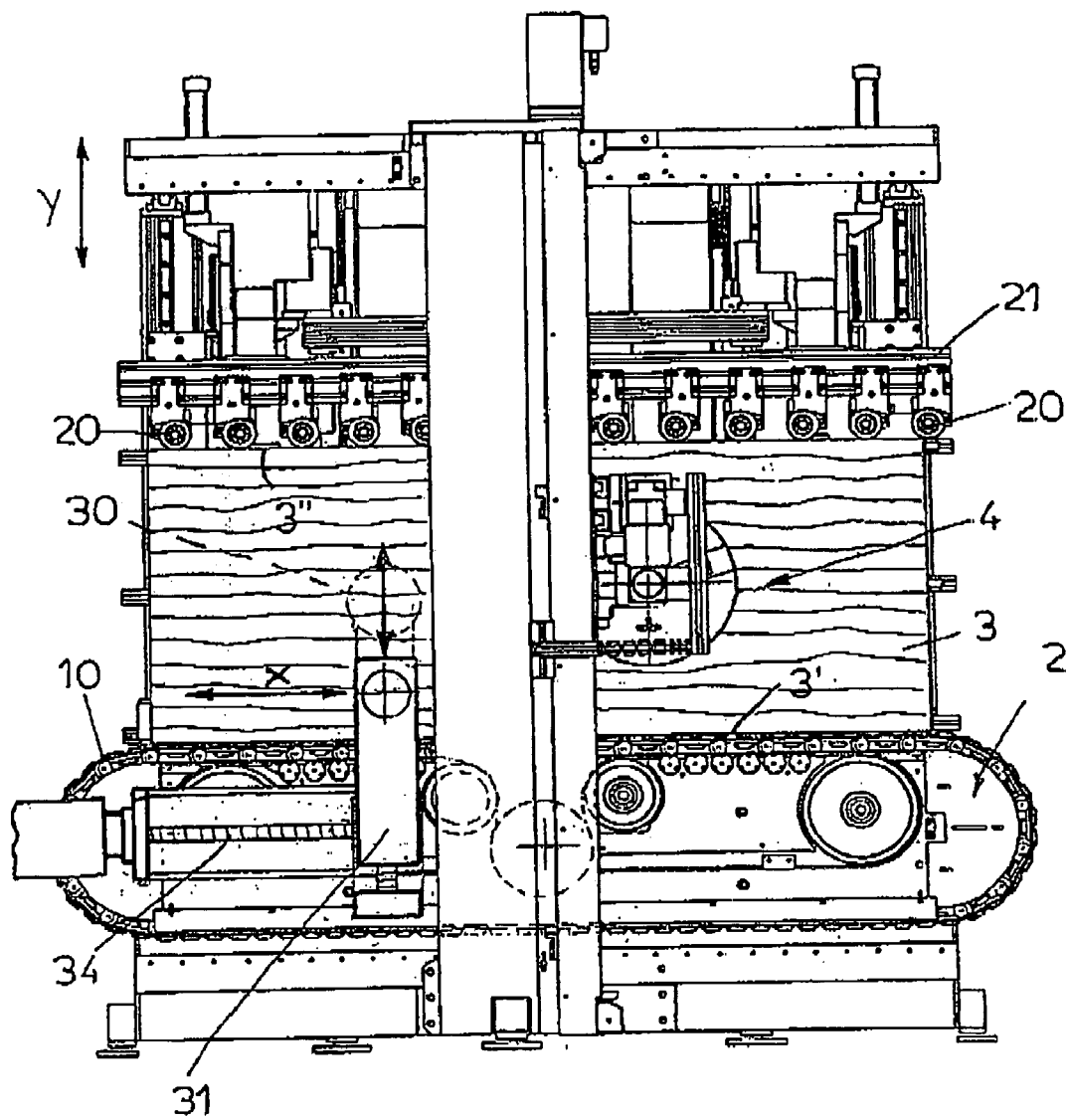
FIG. 3 is an elevation front view of the drilling machine according to the invention.
Figure 4:
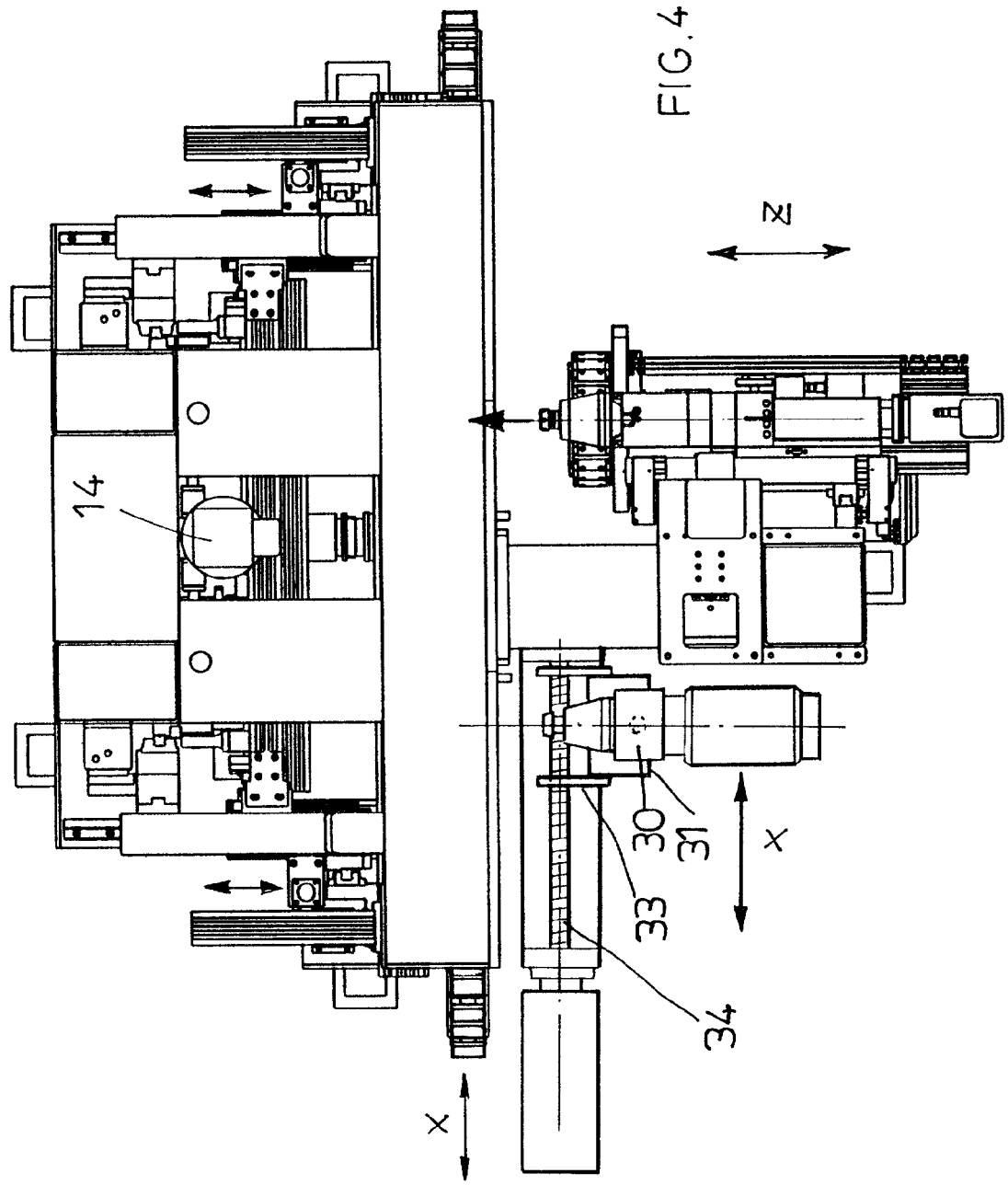
FIG. 4 is a top plan view of the drilling machine according to the invention.
Figure 5:
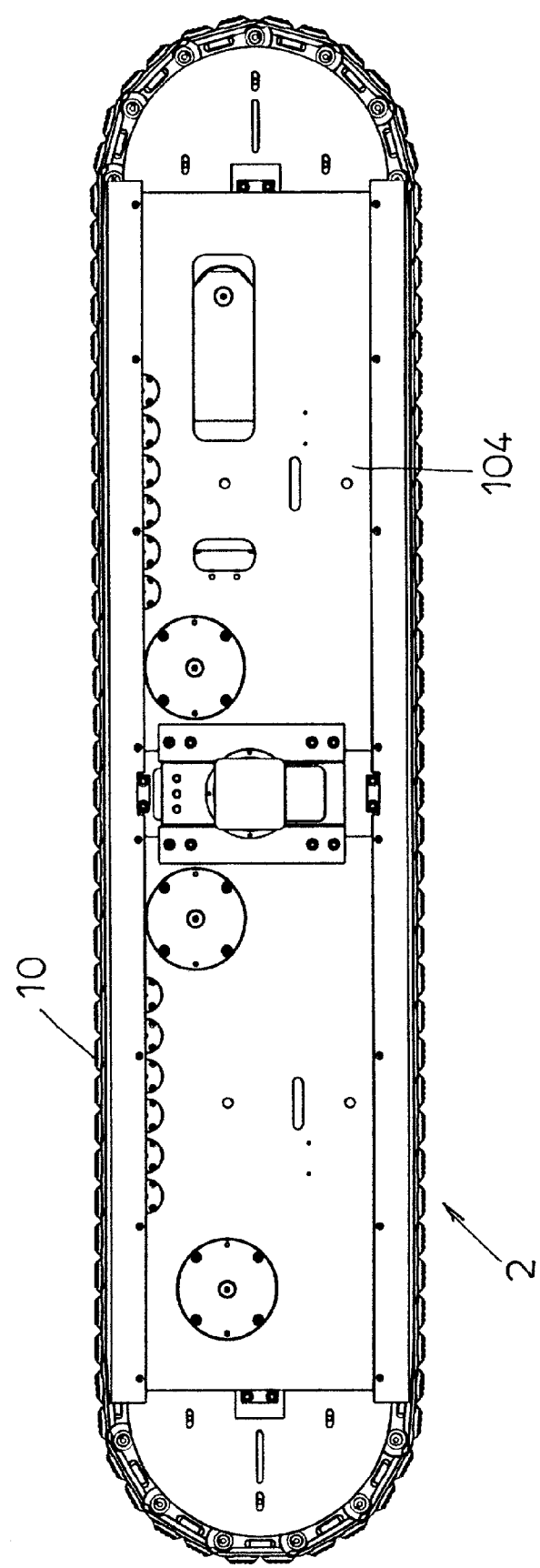
FIG. 5 is an elevation front view of conveyor means for conveying a panel to be drilled.

While in FIG. 1 only horizontal axis rollers 20 are shown, it should be apparent that the panel is further guided by vertical axis rollers 13 and 25, shown in FIG. 2.

In particular, top and middle rear abutment guide rollers 13, having vertical axis, are supported by a section member 21, to abut against the rear surface 3''' of panel 3, said supporting section member being driven along an axis z to fit the abutment rollers 13 to the thickness of the panel 3 being processed.

For the same purpose, moreover, a further bottom horizontal adjustable cross member 24 supports a plurality of bottom rear abutting guide rollers 25 for abutting against the bottom part of said panel rear surface 3'''.

In this connection it should be apparent that the top guide rollers 13, intermediate guide roller 13 and bottom guide rollers, for properly guiding the rear surface of the panel should have, and actually have, as shown in FIG. 2, respective vertical axes.

The assembly, formed by two horizontal arms 26 supporting the roller 20 bearing section member 21, as is in turn supported on columns 19, (of which only one is shown) to be vertically driven with a high driving speed, for example up to 60 m per minute, by vertical driving means which could comprise, for example, rodless pneumatic cylinders, which could also be used for vertically driving said turret 4 and supporting element 5.

The conveyor means, generally indicated by the reference number 2, comprise a conveyor belt 10, including a plurality of conveyor belt links 103 which can slide on guiding means comprising a frame 104 and being driven by a toothed or cogged belt 105, also supported on the supporting frame 104.

Each said link 103 is coupled to adjoining links, by pivot pins 109 and rolling bushings 110.

Each said link 103 is provided, at the bottom thereof, with a plurality of teeth 111 having a configuration and a depth size corresponding to the configuration and size of the teeth 112 of the toothed or cogged belt 105, thereby providing engagement means for engaging the teeth 112 of the toothed belt.

Figure 8:
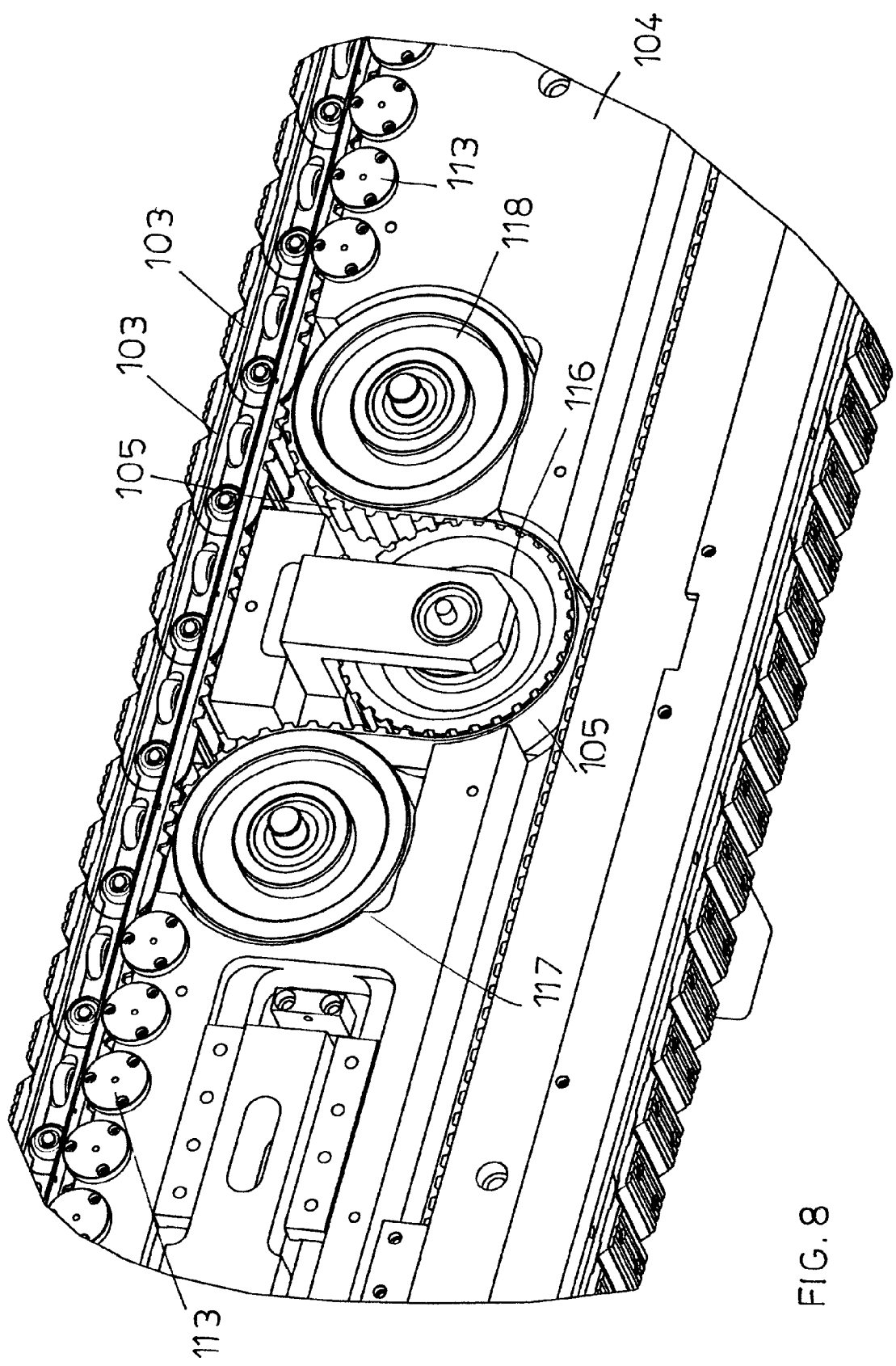
FIG. 8 is an enlarged perspective view of the toothed pulley region of the panel conveyor means.

The toothed belt 105 has its tooth arrangement 112 outward facing and extends with a specifically designed path, as it can be clearly shown in FIGS. 6-8.

More specifically, the toothed belt 105 slides on the supporting frame 104, by defining at least a top flat trajectory or path, as guided by guiding rollers 113, and being then directed through a return path by two end pulleys 114 and 115, arranged at the ends of the trajectory.

At an intermediate region of the top flat trajectory or path, is provided a cogged pulley 116, arranged, at the bottom, between a pair of flat pulleys 117 and 118 which, by cooperating with the cogged pulley 116, cause the toothed or cogged belt 105 to define a downward directed belt loop.

The cogged or toothed pulley 116 is driven by a driving means (not shown) including, depending on requirements, a step by step motor, a DC motor, or a brushless motor, through a suitable motor reducing unit.

The number of the links 103 forming the conveyor belt 10 can be changed depending on the desired length of the conveyor belt, which slides along a substantially oval guide arranged at the periphery of the supporting frame 104.

Said guide comprises two top 121 and bottom 122 rectilinear guide portions, coupled by two semicircular guide portions 123 and 124.

Said guide forms a rail arrangement adapted to engage the guide bearings of the conveyor belt links 103, so as to allow the engagement means comprising the teeth 111 and links 103 to engage the teeth 112 of the belt 105 at least along the top rectilinear portion thereof.

Thus, the belt 105 will drive the conveyor belt 10 the links 103 of which are provided with supporting elements 125 for supporting the panel 3.

The drilling machine 1 according to the invention comprises moreover an auxiliary head 30, for one or more tools, so assembled as to be vertically driven along the axis y and horizontally driven along the axis x.

Said auxiliary head 30 is, to that end, supported by a supporting element 31 which can be driven along a ball recirculating screw element 32, vertically extending, and coupled to a second supporting element 33 in turn movable along a ball recirculating screw 34, which horizontally extends.

Accordingly, the auxiliary head 30 can be driven along the horizontal axis x and vertical axis y, as well as crossway the axis x, to allow the operating tool to affect the panel 3 being processed, while it is driven along the conveyor 10.

In other words, the head 30 can process the panel while being driven therewith, and, at the end of the processing operations, it can be brought again to its starting position to operate upon or process a following panel.

It has been found that the invention fully achieves the intended aim and objects.

In fact, the panel drilling machine according to the present invention can operate with a very high vertical and horizontal speed for clamping the panel and, accordingly, can perform very accurate processing operation, at a very high processing speed.

A further advantage of the drilling machine according to the present invention is that it allows its clamping elements to be driven with a high speed both vertically and horizontally.

Yet another advantage of the panel driving machine according to the present invention is that said machine comprises adjusting systems for adjusting, in a differentiated manner, the thickness of the panel, which adjusting systems allow said panel to be located in a very accurate and quick manner even if said panel comprises different thickness panel regions.

Yet another important advantage of the drilling machine according to the present invention is that it comprises a specifically designed operating system for turning the processing head and latching or engaging it with the central spindle.

In practicing the invention the used materials, as well as the contingent shapes and size can be any, depending on requirements and th status of the art.

The invention claimed is:

1. A drilling machine for drilling wood, plastics material and aluminum variable thickness vertically arranged on-edge supported panels, each said panel having a panel front surface, a panel rear surface, a panel bottom edge and a panel top edge, said drilling machine comprising a panel processing top rotary turret and an intermittent bottom conveyor for supporting said bottom edge of said panel and intermittently horizontally driving said panel to said rotary turret, a first top vertically movable horizontal abutting and guiding roller means comprising a plurality of substantially adjoining horizontal axis rotary rollers for abutting against said top edge of said panel, and a second abutting and guiding vertical axis rotary roller means for abutting against and guiding said rear surface of said panel.

2. A drilling machine according to claim 1 wherein said rotary turret comprises a tool bearing rotary head coupled to a horizontally and vertically movable supporting element, said rotary head including a rotary head drum supporting a plurality of rotary head elements, each said rotary head element having either a single or a multiple tool supporting mandrel.

3. A drilling machine according to claim 1, wherein said bottom conveyor comprises a conveyor belt, including a plurality of interconnected conveyor belt links sliding on a guiding frame, said conveyor belt being driven by a toothed belt also supported by said frame.

4. A drilling machine according to claim 3, wherein said toothed belt is entrained between two end pulleys and is guided along a top flat trajectory by a plurality of top belt guiding rollers, said top flat trajectory having an intermediate region including a bottom toothed pulley arranged between a pair of smooth surface pulleys cooperating with said bottom toothed pulley to define a downward directed toothed belt loop.

5. A drilling machine according to claim 1, wherein said turret is mounted on a supporting element which can be vertically driven along vertical guides defined on an upright, said supporting element being controlled by a ball recirculating screw system for vertically driving said turret, and wherein said turret is rotatively driven by a brushless motor and epicycloidal reducing unit.

6. A drilling machine according to claim 1, wherein said second abutting and guiding roller means for abutting against said rear surface of said panel comprise top, intermediate and bottom rollers respectively for abutting against and guiding a top, an intermediate and a bottom portion of said rear surface of said panel.

7. A drilling machine according to claim 1, wherein said vertical axis rollers are supported by a section member which is so driven as to fit a position of said vertical axis rollers to the thickness of said panel.

8. A drilling machine according to claim 1, wherein said drilling machine further comprises a plurality of bottom holding wheels coupled to a plurality of vertically extending uprights forming a fixed supporting wall for supporting said panel.

* * * * *